(12) United States Patent
Iwanami

(10) Patent No.: US 10,607,063 B2
(45) Date of Patent: Mar. 31, 2020

(54) INFORMATION PROCESSING SYSTEM, INFORMATION PROCESSING METHOD, AND RECORDING MEDIUM FOR EVALUATING A TARGET BASED ON OBSERVERS

(71) Applicant: SONY CORPORATION, Tokyo (JP)

(72) Inventor: Hiroshi Iwanami, Tokyo (JP)

(73) Assignee: SONY CORPORATION, Tokyo (JP)

( * ) Notice: Subject to any disclaimer, the term of this patent is extended or adjusted under 35 U.S.C. 154(b) by 114 days.

(21) Appl. No.: 15/743,190

(22) PCT Filed: Apr. 26, 2016

(86) PCT No.: PCT/JP2016/062972
§ 371 (c)(1),
(2) Date: Jan. 9, 2018

(87) PCT Pub. No.: WO2017/018012
PCT Pub. Date: Feb. 2, 2017

(65) Prior Publication Data
US 2019/0095695 A1 Mar. 28, 2019

(30) Foreign Application Priority Data

Jul. 28, 2015 (JP) ................................ 2015-148201

(51) Int. Cl.
*G06K 9/00* (2006.01)
(52) U.S. Cl.
CPC ..... *G06K 9/00221* (2013.01); *G06K 9/00228* (2013.01); *G06K 9/00308* (2013.01);
(Continued)
(58) Field of Classification Search
None
See application file for complete search history.

(56) References Cited

U.S. PATENT DOCUMENTS 7,127,081 B1 * 10/2006 Erdem ............... G06K 9/00228
382/103
8,204,340 B2 * 6/2012 Kanazawa ........... G06K 9/6211
382/276

(Continued)

FOREIGN PATENT DOCUMENTS

CN 101419666 A 4/2009
JP 2006-330464 A 12/2006
(Continued)

OTHER PUBLICATIONS

The many faces of a Neutral face: Head Tilt and perception of dominance and emotion, Alain Mignault et al., Journal of Nonverbal Behaviour 27(2), 2003, pp. 111-132 (Year: 2003).*

(Continued)

*Primary Examiner* — Jayesh A Patel
(74) *Attorney, Agent, or Firm* — Chip Law Group

(57) ABSTRACT

[Object] To provide an information processing system, an information processing method, and a recording medium capable of more correctly calculating an evaluation on a target in accordance with a substantially downward face of an observer. [Solution] An information processing system including: a degree-of-smile detection unit configured to detect a degree of smile of an observer observing a target; a face orientation detection unit configured to detect a degree of facing downward that indicates a degree to which a face of the observer is facing substantially downward; and an evaluation calculation unit configured to calculate an evaluation on the target in accordance with the degree of smile and the degree of facing downward.

10 Claims, 11 Drawing Sheets

(52) U.S. Cl.
CPC ..... *G06K 9/00335* (2013.01); *G06K 9/00771* (2013.01); *G06K 9/00778* (2013.01)

(56) References Cited

U.S. PATENT DOCUMENTS

| | | | | |
|---|---|---|---|---|
| 8,385,607 B2* | 2/2013 | Okada | ................ | G06K 9/00228 348/333.02 |
| 9,117,111 B2* | 8/2015 | Mori | ................ | G06K 9/00281 |
| 9,473,804 B1* | 10/2016 | Glasgow | ........ | H04N 21/23424 |
| 2005/0219395 A1* | 10/2005 | Sugimoto | ......... | G06K 9/00221 348/333.12 |
| 2006/0192775 A1* | 8/2006 | Nicholson | ................ | A61F 4/00 345/211 |
| 2007/0008322 A1* | 1/2007 | Ludwigsen | ............ | G06T 13/80 345/473 |
| 2007/0239071 A1* | 10/2007 | Noguchi | ................ | A61B 5/16 600/587 |
| 2008/0008361 A1* | 1/2008 | Nozaki | ................ | H04N 5/232 382/118 |
| 2008/0050022 A1* | 2/2008 | Okada | ................ | G06K 9/00234 382/209 |
| 2008/0118156 A1* | 5/2008 | Okada | ................ | G06K 9/00228 382/195 |
| 2009/0087099 A1 | 4/2009 | Nakamura | | |
| 2009/0190803 A1* | 7/2009 | Neghina | ................ | H04N 5/232 382/118 |
| 2009/0199105 A1* | 8/2009 | Kamada | ................ | G06Q 10/10 715/738 |
| 2009/0316962 A1* | 12/2009 | Sun | ................ | G06K 9/00248 382/118 |
| 2011/0081089 A1* | 4/2011 | Mori | ................ | G06K 9/00281 382/218 |
| 2011/0149160 A1* | 6/2011 | Shintani | ............ | G06K 9/00315 348/564 |
| 2012/0094773 A1* | 4/2012 | Suzuki | ................ | A63F 13/655 463/43 |
| 2012/0324491 A1* | 12/2012 | Bathiche | ................ | H04H 60/33 725/10 |
| 2013/0038601 A1* | 2/2013 | Han | ................ | G06T 13/40 345/419 |
| 2013/0152113 A1* | 6/2013 | Conrad | ............ | H04N 21/42201 725/12 |
| 2013/0201359 A1* | 8/2013 | Wu | ................ | H04N 5/23219 348/222.1 |
| 2013/0308829 A1* | 11/2013 | Kawanishi | ............... | H04N 5/91 382/107 |
| 2014/0245369 A1* | 8/2014 | Green | ................ | H04N 21/2368 725/116 |
| 2014/0247374 A1* | 9/2014 | Murakami | ......... | H04N 5/23219 348/222.1 |
| 2015/0199730 A1* | 7/2015 | Soon-Shiong | ..... | G06Q 30/0269 705/14.66 |
| 2015/0221287 A1* | 8/2015 | Badawiyeh | ........... | G06F 3/0236 345/659 |
| 2015/0358594 A1* | 12/2015 | Marshall | ................ | G06F 3/013 345/419 |
| 2016/0174838 A1* | 6/2016 | Herranen | ............... | A61B 3/152 351/211 |
| 2017/0039869 A1* | 2/2017 | Gleim | ....................... | G09B 5/12 |
| 2017/0047096 A1* | 2/2017 | Li | ............................ | G11B 27/34 |
| 2018/0053219 A1* | 2/2018 | Hutton | ....................... | G06K 9/00 |
| 2018/0211693 A1* | 7/2018 | Iwanami | ................. | G11B 27/102 |
| 2018/0220065 A1* | 8/2018 | Kobayashi | ......... | H04N 5/23216 |

FOREIGN PATENT DOCUMENTS

| | | | |
|---|---|---|---|
| JP | 2006330464 A | * 12/2006 | |
| JP | 2007-097668 A | 4/2007 | |
| JP | 2007-104091 A | 4/2007 | |
| JP | 2009-089077 A | 4/2009 | |
| JP | 2009-267445 A | 11/2009 | |
| JP | 2013-214985 A | 10/2013 | |
| WO | 2013/039062 A1 | 3/2013 | |
| WO | WO-2013039062 A1 | * 3/2013 | ............... G09B 5/00 |

OTHER PUBLICATIONS

International Search Report and Written Opinion of PCT Application No. PCT/JP2016/062972, dated Jul. 5, 2016, 09 pages of ISRWO.

* cited by examiner

STRAP TYPE HELMET TYPE

FIG. 13
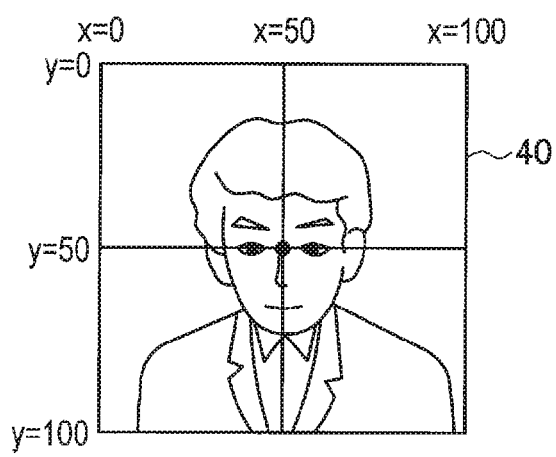
CASE WHERE FACE
IS FRONT-FACING
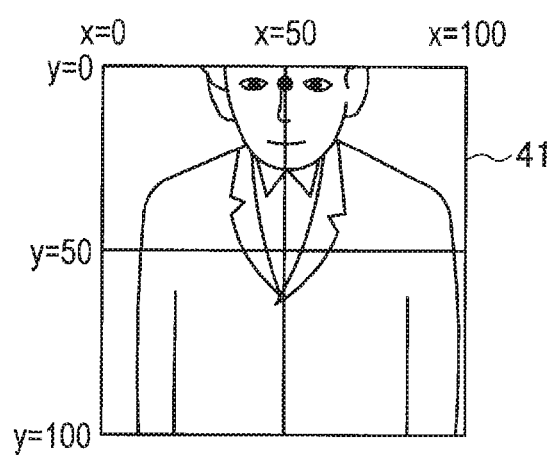
CASE WHERE FACE ORIENTATION
HAS BEEN DISPLACED FROM
FRONT (HAS BECOME DOWNWARD)

INFORMATION PROCESSING SYSTEM, INFORMATION PROCESSING METHOD, AND RECORDING MEDIUM FOR EVALUATING A TARGET BASED ON OBSERVERS

CROSS REFERENCE TO RELATED APPLICATIONS

This application is a U.S. National Phase of International Patent Application No. PCT/JP2016/062972 filed on Apr. 26, 2016, which claims priority benefit of Japanese Patent Application No. JP 2015-148201 filed in the Japan Patent Office on Jul. 28, 2015. Each of the above-referenced applications is hereby incorporated herein by reference in its entirety.

TECHNICAL FIELD

The present disclosure relates to an information processing system, an information processing method, and a recording medium.

BACKGROUND ART

Conventionally, there are many situations in which it is desired to grasp things such as with how much interest an audience looks at or listens to a lecturer of a lecture meeting, a teacher at a university, an instructor at a cram school, a comedian, and the like. For example, a case where a lecturer of a lecture meeting desires to know to what degree he/she could attract attention of an audience in a lecture, a case where, when evaluating an instructor at a cram school, it is desired to use how many students listened to a talk of the instructor with interest as an evaluation material, and the like are assumed. In addition, there are cases where, not only when evaluating people but also when evaluating a content displayed on a television or a digital signage, it is desired to grasp how many people in the audience listened to or looked at the content with interest.

As a technology concerning such an evaluation, Patent Literature 1, for example, describes a system of calculating the degree of satisfaction on the basis of at least one of an evaluation value of the degree of attention based on a line of sight of a viewing user who views a content and an evaluation value of an expression at that time (smile level) and evaluating the content to play back only a scene with a high degree of satisfaction or make a content recommendation.

Moreover, Patent Literature 2 describes a system capable of shooting video of a stage or the like and also shooting expressions of visitors, and storing the number of smiley men and women as an index every 30 seconds to extract only images in a time zone that women made high evaluations and play back a digest.

Furthermore, Patent Literature 3 describes a system of inputting a favorite degree of a user at predetermined time intervals of a moving image being recorded and extracting, from the moving image, portions with a high favorite degree and portions before and after a time point when a smile of a person detected from the moving image is included for playback.

CITATION LIST

Patent Literature

| patent Literature 1: | JP 2009-267445A |
| patent Literature 2: | JP 2007-104091A |
| patent Literature 3: | JP 2013-214985A |

DISCLOSURE OF INVENTION

Technical Problem

However, all of the Patent Literatures described above perform digest playback of video or playback of scenes using a fact as to whether a viewing user is smiling as a main evaluation basis, and none of them can fully grasp user's interest to a target correctly. In particular, the only way to survey to what degree an audience actually paid attention to a workshop, a seminar, or the like and to what degree it was received favorably is to present a direct questionnaire or an oral question to the audience.

Therefore, the present disclosure proposes an information processing system, an information processing method, and a recording medium capable of more correctly calculating an evaluation on a target in accordance with a substantially downward face of an observer.

Solution to Problem

According to the present disclosure, there is proposed an information processing system including: a degree-of-smile detection unit configured to detect a degree of smile of an observer observing a target; a face orientation detection unit configured to detect a degree of facing downward that indicates a degree to which a face of the observer is facing substantially downward; and an evaluation calculation unit configured to calculate an evaluation on the target in accordance with the degree of smile and the degree of facing downward.

According to the present disclosure, there is proposed an information processing method, including, by a processor: detecting a degree of smile of an observer observing a target; detecting a degree of facing downward that indicates a degree to which a face of the observer is facing substantially downward; and calculating an evaluation on the target in accordance with the degree of smile and the degree of facing downward.

According to the present disclosure, there is proposed a recording medium having a program recorded therein, the program causing a computer to function as: a degree-of-smile detection unit configured to detect a degree of smile of an observer observing a target; a face orientation detection unit configured to detect a degree of facing downward that indicates a degree to which a face of the observer is facing substantially downward; and an evaluation calculation unit configured to calculate an evaluation on the target in accordance with the degree of smile and the degree of facing downward.

Advantageous Effects of Invention

As described above, according to the present disclosure, it is possible to calculate more correctly an evaluation on a target in accordance with a substantially downward face of an observer.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 13 is an illustration describing a case of detecting a degree of facing downward of a user's face using an image imaged with a camera according to the present embodiment.

MODE(S) FOR CARRYING OUT THE INVENTION

Figure 1:
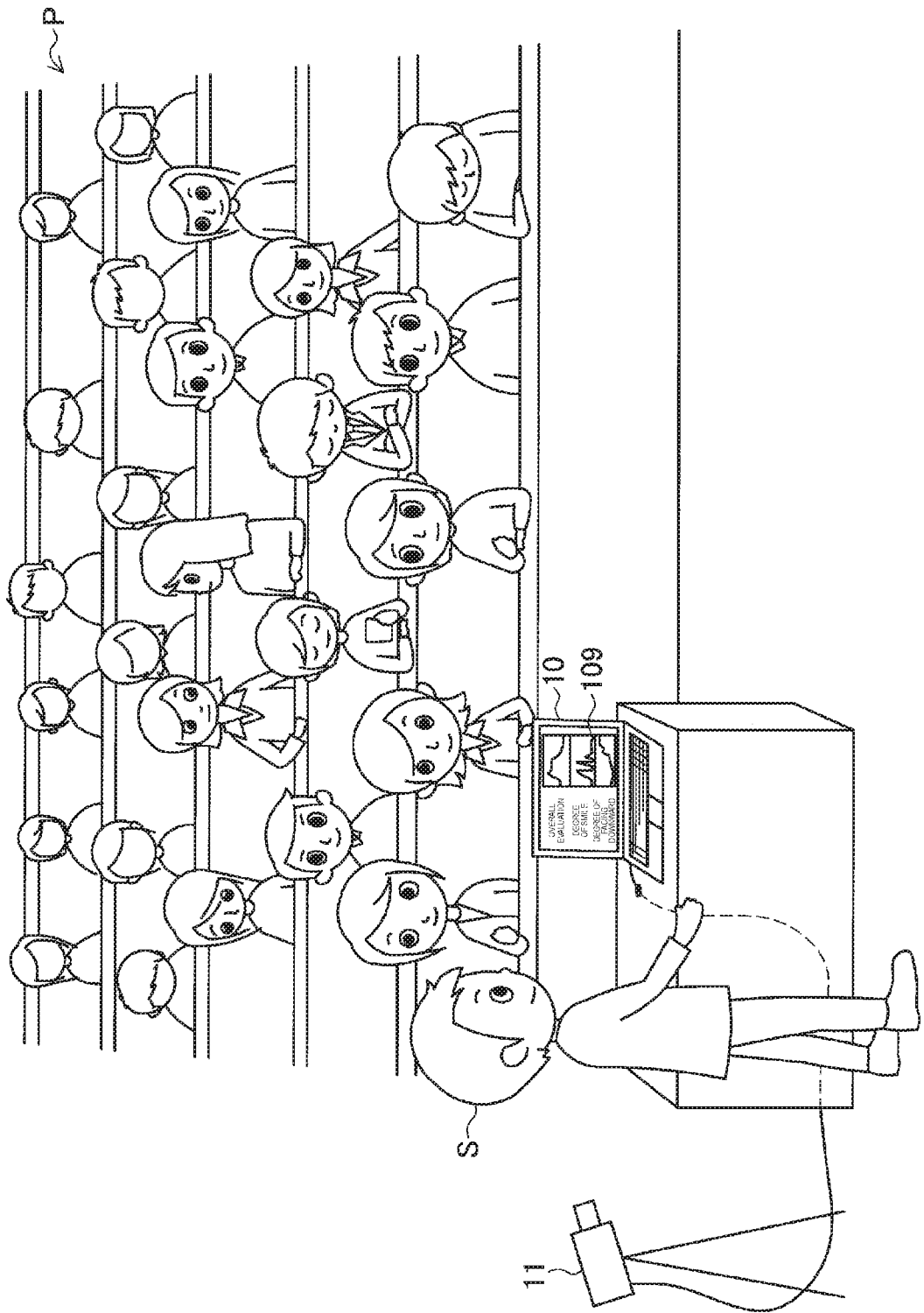
FIG. 1 is an illustration describing an overview of an information processing system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

In addition, description will be made in the following order.

1. Overview of information processing system according to an embodiment of the present disclosure
2. Configuration
3. Operation process
4. Display examples
5. Supplement
6. Conclusion «1. Overview of Information Processing System According to an Embodiment of the Present Disclosure»

FIG. 1 is an illustration describing an overview of an information processing system according to an embodiment of the present disclosure. As shown in FIG. 1, the information processing system according to the present embodiment is capable of calculating an evaluation of an audience P observing a target S on the target S, displaying an evaluation result on a display device 109 of an information processing device 10 in real time, for example, and giving feedback to the target S. The evaluation of the audience P on the target S may be performed on the basis of an analysis of an imaged image of the audience P imaged with a camera 11, for example.

More specifically, the information processing system according to the present embodiment is capable of performing an evaluation of a lecturer (the target S) performing a workshop, a seminar, or the like as shown in FIG. 1 or the audience P viewing a content such as video or a game more correctly and with high accuracy.

Since a person usually gazes and observes a target in which he/she is interested, a time during which he/she pays attention to the target necessarily becomes longer in proportion to the degree of interest. In a lecture, for example, the proportion of a time during which the face is facing a lecturer increases, and in a case where a target is regarded favorably, the proportion of making a smile increases.

However, there may be a case where, because an audience has interest in a talk of a lecturer or a content, the audience discusses its details to some degree with people in the neighboring seats or thinks hard on its details by themselves. At this time, a line of sight and a face orientation of a user will face sideways or upward. Therefore, if an evaluation on a target is calculated only on the basis of a time of gazing the target (a time during which the face is front-facing) or the degree of smile, a sideways or upward state in which the audience may actually has interest in the target will not be taken into consideration, and thus, a calculated evaluation cannot be regarded as being correct.

On the other hand, a case where a user having no interest in the target is facing sideways or upward is also assumed, and it is somewhat indefinite as to whether a user facing sideways or upward has interest in the target.

Here, it has been revealed from actual questionnaires, experiences, or actual feeling that a user facing downward and dozing or facing downward and operating a smartphone has no interest in the target. Since it has been revealed that facing downward is directly linked to having no interest in a target, an evaluation of an audience on a target can be calculated more correctly and with high accuracy in the present embodiment by taking into consideration the degree of facing downward indicating the degree that the face (or line of sight) is facing substantially downward in addition to the degree of smile of the audience.

That is, in the information processing system according to the present embodiment, an imaged image obtained by imaging the audience P, for example, with the camera 11 is analyzed to perform face detection, and a proportion of the number of faces facing a substantially downward or a downward angle is calculated as the degree of facing downward and presented as one of evaluations on the target S. Moreover, the information processing system according to the present embodiment may also present the degree of smile of the audience P detected by analyzing the imaged image as one of evaluations. Furthermore, the information processing system is also capable of calculating and presenting an overall evaluation based on the degree of facing downward and the degree of smile having been calculated.

Calculation and presentation of each of such evaluation values may be performed in real time as shown in FIG. 1.

A specific configuration example and operation process of the above-described information processing system according to an embodiment of the present disclosure will be described below.

«2. Configuration»

<2-1. Hardware Configuration>

Figure 2:
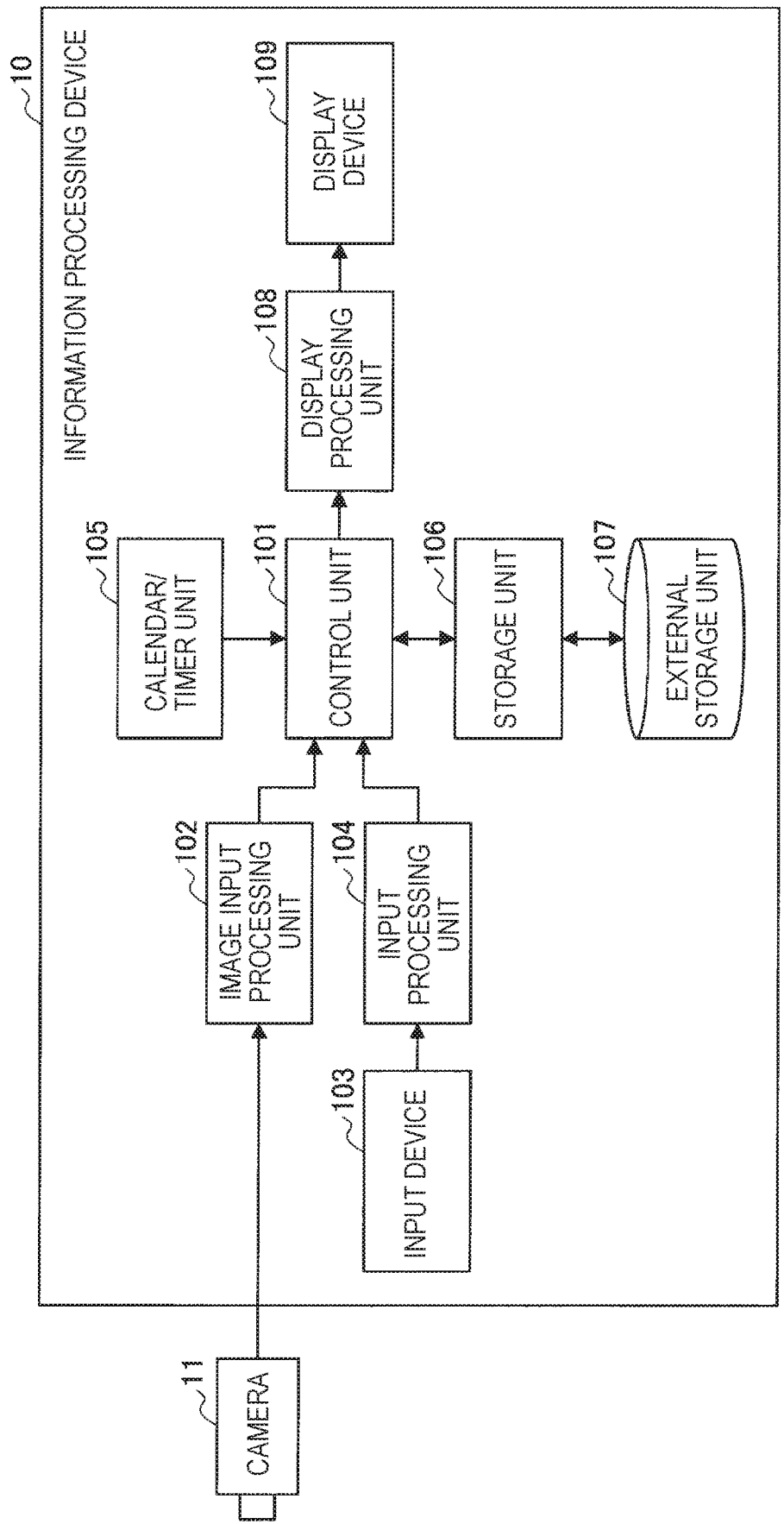
FIG. 2 is a block diagram showing a configuration example of an information processing device according to the present embodiment.

FIG. 2 is a block diagram showing a hardware configuration example of the information processing device 10 according to a first embodiment. As shown in FIG. 2, the information processing device 10 has a control unit 101, an image input processing unit 102, an input device 103, an input processing unit 104, a calendar/timer unit 105, a storage unit 106, an external storage unit 107, a display processing unit 108, and the display device 109. Here, the information processing device 10 is implemented by a personal computer (PC) as shown in FIG. 1, for example, whilst the information processing device 10 according to the present embodiment is not limited to this, but may be implemented by a smartphone, a mobile phone terminal, a tablet terminal, a tablet terminal, a wearable device, a game machine, a music player, or the like, for example. In addition, as to the information processing device 10, the input device 103 and/or the display device 109 may be separate members, and may be configured to be connected to the information processing device 10 by wire/wirelessly.

The control unit 101 functions as an operation processing device and a control device, and controls all the operations in the information processing device 10 in accordance with various programs. The control unit 101 is implemented by an electronic circuit, such as a central processing unit (CPU) or a microprocessor, for example. Specific functions of the control unit 101 of the present embodiment will be described later with reference to FIG. 3.

The storage unit 106 is implemented by a read only memory (ROM) that stores programs, operation parameters, and the like for use in processing in the control unit 101 and a random access memory (RAM) that temporarily stores parameters that vary as necessary, and the like.

The external storage unit 107 is a storage medium, such as a hard disc drive (HDD) or a solid state drive (SSD), that stores images imaged with the camera 11 and various contents, for example.

The image input processing unit 102 performs various types of processing on an imaged image imaged with the camera 11, and outputs prepared image information to the control unit 101. For example, the image input processing unit 102 may perform conversion, adjustment, noise removal, edge detection (image enhancement), and the like on the imaged image. The camera 11 images many faces in the whole audience, and sends imaged images to the information processing device 10 by wire/wirelessly. For example, the camera 11 is implemented by a fixed camera. Alternatively, the camera 11 is not limited to an external device, but may be configured to be included in the information processing device 10.

The input device 103 is implemented by a keyboard, a mouse, a touch panel, a switch, a button, or the like, and detects an operation input made by a user, and outputs a detected input signal to the input processing unit 104. Alternatively, the input device 103 may be implemented by a microphone.

The input processing unit 104 performs various types of processing on the input signal input from the input device 103, and prepared input information to the control unit 101. For example, the input processing unit 104 may perform conversion, noise removal, waveform processing, and the like on the input signal.

The calendar/timer unit 105 measures a time, and outputs timing information to the control unit 101.

The display processing unit 108 performs various types of processing for outputting information output from the control unit 101 to the display device 109. For example, the display processing unit 108 may perform conversion, intensity adjustment, screen generation, and the like on the output information.

The display device 109 is an example of output device, and is implemented by a display device, such as a liquid crystal display (LCD) device or an organic EL (organic light emitting diode (OLED)) display device. For example, the display device 109 displays an evaluation of an audience on a target calculated by the control unit 101 and converted into a graph by the display processing unit 108.

The hardware configuration example of the information processing device 10 according to the present embodiment has been described above. Note that the configuration of the information processing device 10 is not limited to the example shown in FIG. 2, but may further has a network I/F.

<2-2. Functional Component Example>

Figure 3:
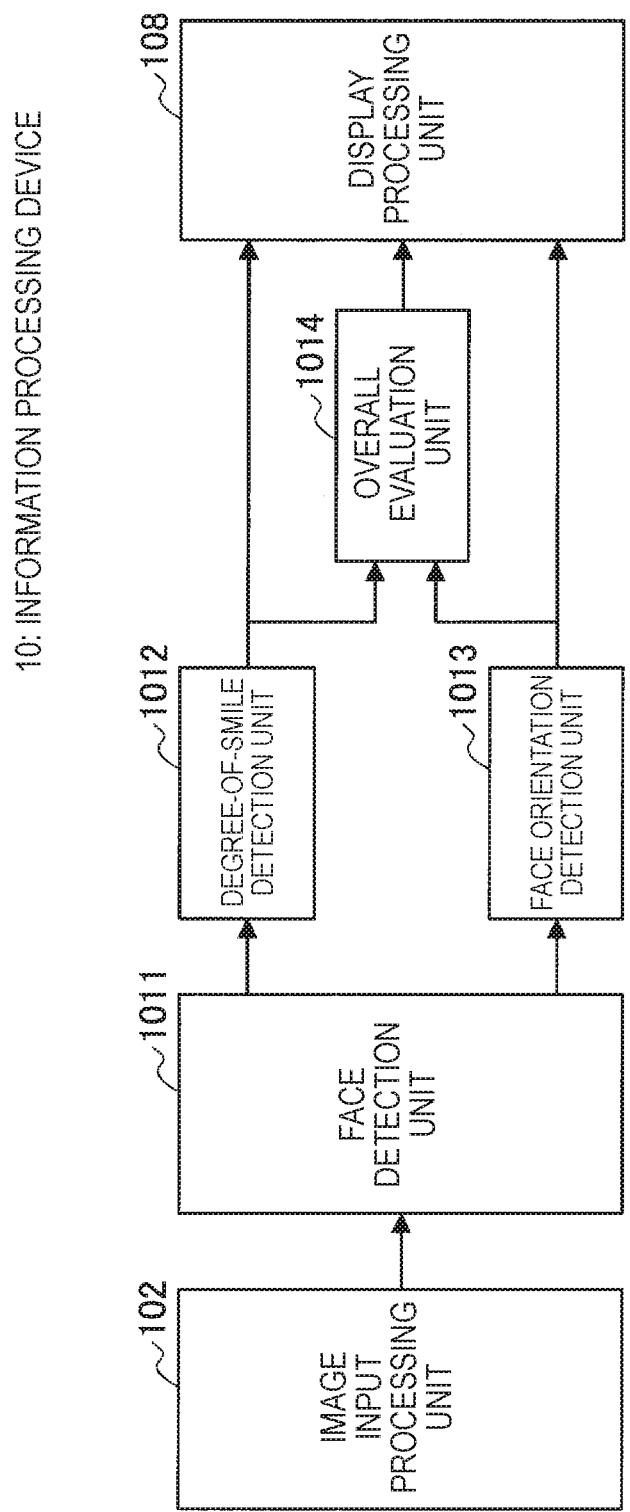
FIG. 3 is a block diagram showing a functional configuration example of the information processing device according to the present embodiment.

FIG. 3 is a block diagram showing a functional component example of the information processing device 10 according to the first embodiment. In the illustrated example, the image input processing unit 102 and the display processing unit 108 are shown as functional components in addition to each function of the control unit 101, for the sake of description.

The information processing device 10 functions as a face detection unit 1011, a degree-of-smile detection unit 1012, a face orientation detection unit 1013, and an overall evaluation unit 1014, as shown in FIG. 3. These functions may be implemented as the functions of the control unit 101.

Figure 4:
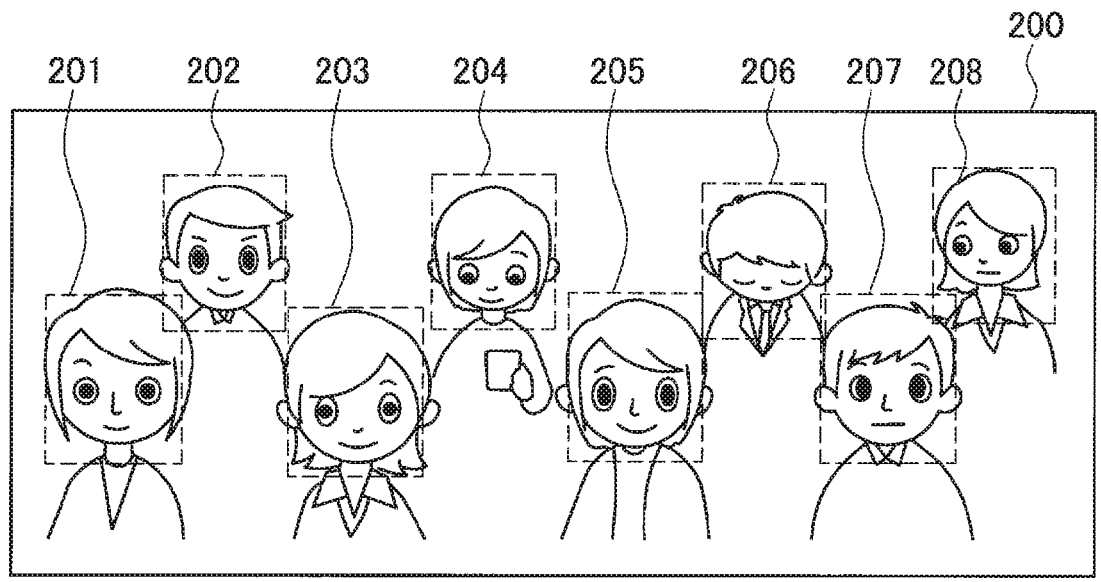
FIG. 4 is an illustration describing face detection according to the present embodiment.

The face detection unit 1011 analyzes an imaged image output from the image input processing unit 10 to perform face detection. An algorithm for face detection is not particularly limited, but an existing technique may be used. Accordingly, it is possible to detect face images 201 to 208 from an imaged image 200 as shown in FIG. 4, for example.

The degree-of-smile detection unit 1012 performs face recognition on the faces detected by the face detection unit 1011 to detect the degree of smile of each of the faces. An algorithm for face recognition is not particularly limited, but an existing technique may be used. The degree-of-smile detection unit 1012 outputs a degree of smile sm at a value of 0 to 100 using a detector having machine-learned smile samples, for example. An output value of the degree of smile sm is not limited to this, but a minus evaluation may be included. For example, a face expressing an aversion, such as an angry face or an annoyed face, may be indicated with a degree of smile of −100 to 0. In this case, a degree of smile of 0 may be defined as a "serious expression" or "lack of expression."

In this manner, the degree of smile of each of the faces included in the imaged image 200 may be detected. Here, since the imaged image 200 includes a plurality of faces as shown in FIG. 4, the degree-of-smile detection unit 1012 outputs an average value obtained by dividing a sum of the degrees of smile of the respective persons at a certain instant by the whole number of people (the degree of smile SM per screen) as an evaluation result of the degree of smile. The evaluation result of the degree of smile is output to the display processing unit 108 and the overall evaluation unit 1014.

Note that the evaluation result of the degree of smile is not limited to this, but, for example, the degree-of-smile detection unit 1012 may provide a threshold value (for example, 50%), and in a case where the degree of smile exceeds the threshold value, may count it as a smile and output the number of smiley persons (or a proportion) as an evaluation result of the degree of smile. That is, for example, the degree-of-smile detection unit 1012 does not count a degree of smile of 0 to 49 as a smile, and counts a degree of smile of 50 to 100 as a smile.

Figure 5:
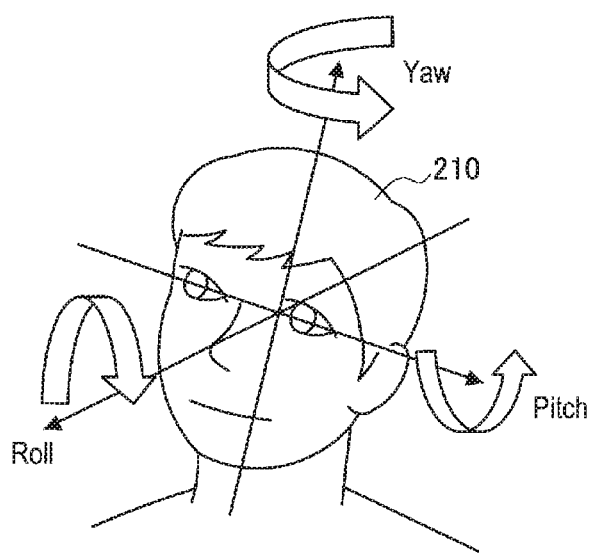
FIG. 5 is an illustration describing a face orientation (angle) according to the present embodiment.

The face orientation detection unit 1013 performs face recognition on the faces detected by the face detection unit 1011 to detect the degree of facing downward of each of the faces. An algorithm for face recognition is not particularly limited, but an existing technique may be used. The face orientation detection unit 1013 obtains a rotation angle in a Pitch direction with the front face serving as a basis, using a detector subjected to machine learning, for example. Here, FIG. 5 shows an illustration describing a face orientation (angle). As shown in FIG. 5, the face orientation refers to an orientation of the face 210 based on rotations in three-axis directions, for example, including three types of Roll, Pitch, and Yaw in the respective axial directions. The face orientation detection unit 1013 may detect a substantially downward (also including diagonally downward such as diagonally downward to the right and diagonally downward to the left) angle to about −60 degrees, for example, in the Pitch direction using a front face as a basis (0 degree). Then, the face orientation detection unit 1013 normalizes the front (0 degree) to downward (−60 degrees) to 0 to 100 to acquire a degree of facing downward dd.

Note that an evaluation result of a degree of facing downward is not limited to this, but the face orientation detection unit 1013, for example, may count the number of persons facing downward (the number of persons having a downward angle exceeding a predetermined threshold value, for example) and output the number of persons facing downward (or the proportion) as an evaluation result of the degree of facing downward.

In this manner, the degree of facing downward of each of the faces included in the imaged image 200 may be detected. Here, since the imaged image 200 includes a plurality of faces as shown in FIG. 4, the face orientation detection unit 1013 outputs an average value (the degree of facing downward DD per screen) obtained by dividing a sum of the degrees of facing downwards of the respective persons at a certain instant by the whole number of people as an evaluation result of the degree of facing downward. The evaluation result of the degree of facing downward is output to the display processing unit 108 and the overall evaluation unit 1014.

The overall evaluation unit 1014 calculates an overall evaluation on the basis of the degree of smile SM and the degree of facing downward DD. For example, the overall evaluation unit 1014 calculates an overall evaluation value in accordance with the following Expression 1 as an evaluation is high in a case of front-facing and smiling. The calculated overall evaluation result is output to the display processing unit 108.

[Math. 1]

$$\text{Overall Evaluation Value} = \text{Degree of Smile } SM \text{ (per screen)} \times \{100 - \text{Degree of Facing Downward } DD \text{ (per screen)}\} \quad \text{Expression 1}$$

As described above, the degree of smile SM per screen (an example of evaluation value), the degree of facing downward DD (an example of evaluation value), and an overall evaluation value (an example of evaluation value) are calculated, and are each output to the display processing unit 108. The display processing unit 108 generates a screen that represents each evaluation value by a time-series graph, for example, and outputs the screen to the display device 109.

«3. Operation Process»

Figure 6:
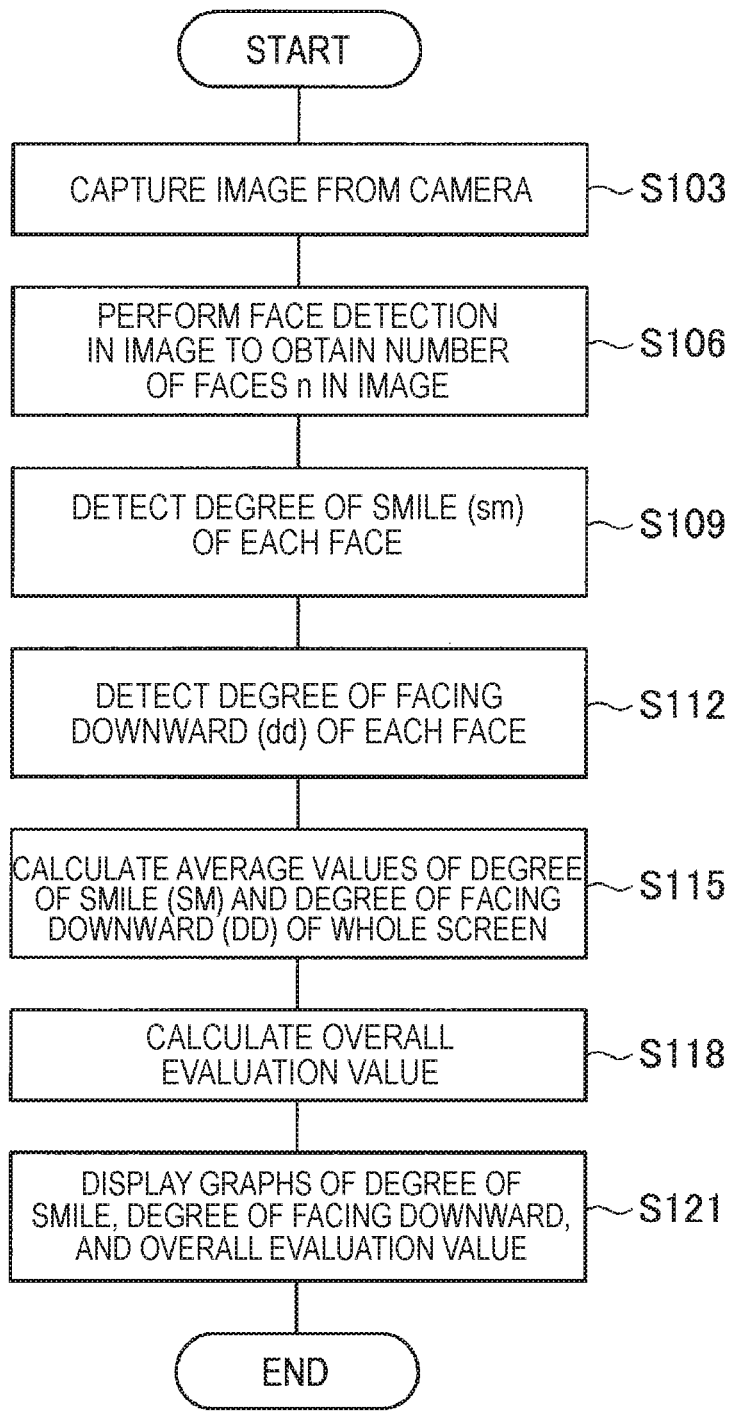
FIG. 6 is a flowchart showing an operation process of the information processing system according to the present embodiment.

Subsequently, an operation process of the information processing system according to the present embodiment will be described with reference to FIG. 6. FIG. 6 is a flowchart showing an operation process of the information processing system according to the present embodiment.

As shown in FIG. 6, first, the information processing device 10 captures, by the image input processing unit 102, an imaged image of an audience imaged with the camera 11 (step S103).

Next, the control unit 101 performs face detection in the image by the face detection unit 1011 to acquire the number of faces n in the image (step S106).

Then, the control unit 101 detects, by the degree-of-smile detection unit 1012, the degree of smile sm (for example, 0 to 100) of each of the faces detected by the face detection unit 1011 (step S109).

Next, the control unit 101 detects, by the face orientation detection unit 1013, the degree of facing downward dd (for example, 0 to 100) of each of the faces detected by the face detection unit 1011 (step S112).

Then, the control unit 101 calculates an average value of the degree of smile SM of the whole screen by the degree-of-smile detection unit 1012 and an average value of the degree of facing downward DD of the whole screen by the face orientation detection unit 1013 (step S115). Specifically, they are calculated respectively by the following Expression 2 and Expression 3, for example.

[Math. 2]

$$\text{Degree of Smile } SM \text{ per Screen} = (\Sigma^n sm)/n \quad \text{Expression 2}$$

[Math. 3]

$$\text{Degree of Facing Downward } DD \text{ per Screen} = (\Sigma^n dd)/n \quad \text{Expression 3}$$

Next, the control unit 101 calculates, by the overall evaluation unit 1014, an overall evaluation value using the degree of smile SM and the degree of facing downward DD having been calculated above (step S118). The overall evaluation value is calculated by the above Expression 1, for example.

Then, the display processing unit 108 of the information processing device 10 causes graphs of the degree of smile, the degree of facing downward, and the overall evaluation value to be displayed on the display device 109 (step S121).

The operation process of the present embodiment has been described above specifically. Subsequently, a display example of evaluation values by the display processing unit 108 will be described with reference to FIG. 7 to FIG. 9.

«4. Display Example»

Figure 7:
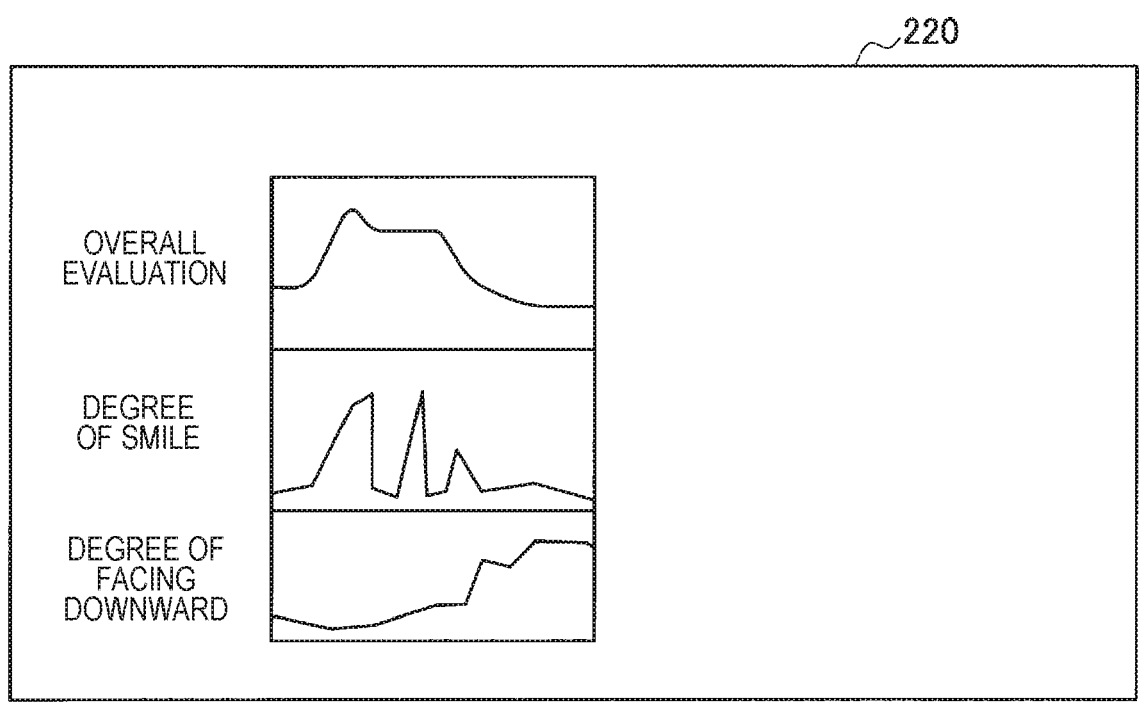
FIG. 7 is an illustration showing a display example of evaluation values according to the present embodiment.

FIG. 7 is an illustration showing a display example of evaluation values according to the present embodiment. In the illustrated example, the overall evaluation, the degree of smile, and the degree of facing downward are each displayed by line graphs on a screen 220. Each of the line graphs may be displayed in accordance with time series of imaged images obtained by imaging an audience with the camera 11. In a case where the operation process shown in FIG. 6 is being performed in real time, the target S can check the respective evaluation values at present changing continuously by the line graphs while performing a seminar or the like, as shown in FIG. 1. The graphs are not limited to the line graphs, but may be scatter diagrams, bar charts, or the like.

Note that calculation of evaluation values are not limited to real time, but a case where it is performed on the basis of imaged images obtained in the past by imaging an audience is also assumed as a matter of course. In this case, the display processing unit 108 is also capable of displaying an evaluation value per scene or per progress item in association with a scene of the details of the seminar of the target S and a time, for example. Alternatively, the display processing unit 108 may display the graphs of the respective evaluation values as shown in FIG. 7 while playing back video of the details of the seminar of the target S.

In addition, in a case where the degree of smile and the degree of facing downward are each output as the number of people (or the proportion to the whole), the display processing unit 108 may display these numbers of people (proportion) by time-series graphs (for example, bar charts or the like).

(Evaluation of a Plurality of Targets)

Figure 8:
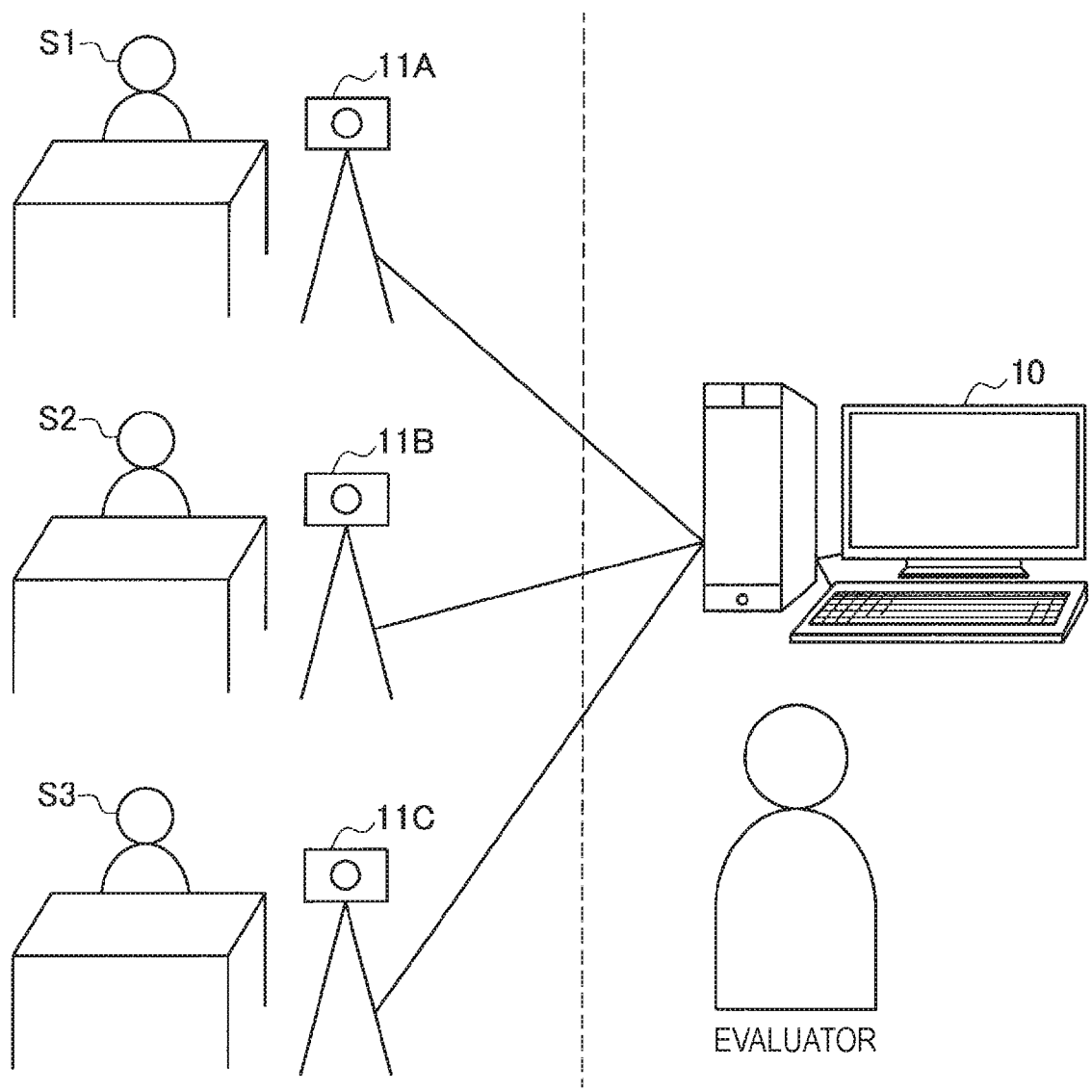
FIG. 8 is an illustration describing an overview of an information processing system that performs an evaluation comparison among a plurality of targets according to the present embodiment.

Next, as another display example of the present embodiment, displaying evaluation values of a plurality of targets in line will be cited. For example, the information processing system according to the present embodiment may image conditions of respective persons in an audience in seminars or the like of a plurality of targets S1, S2, and S3 with cameras 11A, 11B, and 11C, respectively, as shown in FIG. 8, and may calculate an evaluation on each target by the information processing device 10.

The information processing device 10 may calculate evaluations on the plurality of targets S1, S2, and S3 in real time and present the evaluations to an evaluator, or may calculate and present evaluations on the basis of imaged images of the audience in seminars in the past. A plurality of cameras 11 are included in the example shown in FIG. 8, whilst the present embodiment is not limited to this, but there may be a single camera. For example, in a case where a plurality of lecturers perform seminars sequentially in the same classroom and an evaluation of each lecturer is made later on, it is possible to sequentially image imaging of an audience in a seminar of each lecturer by a single camera 11 fixed in the classroom.

Figure 9:
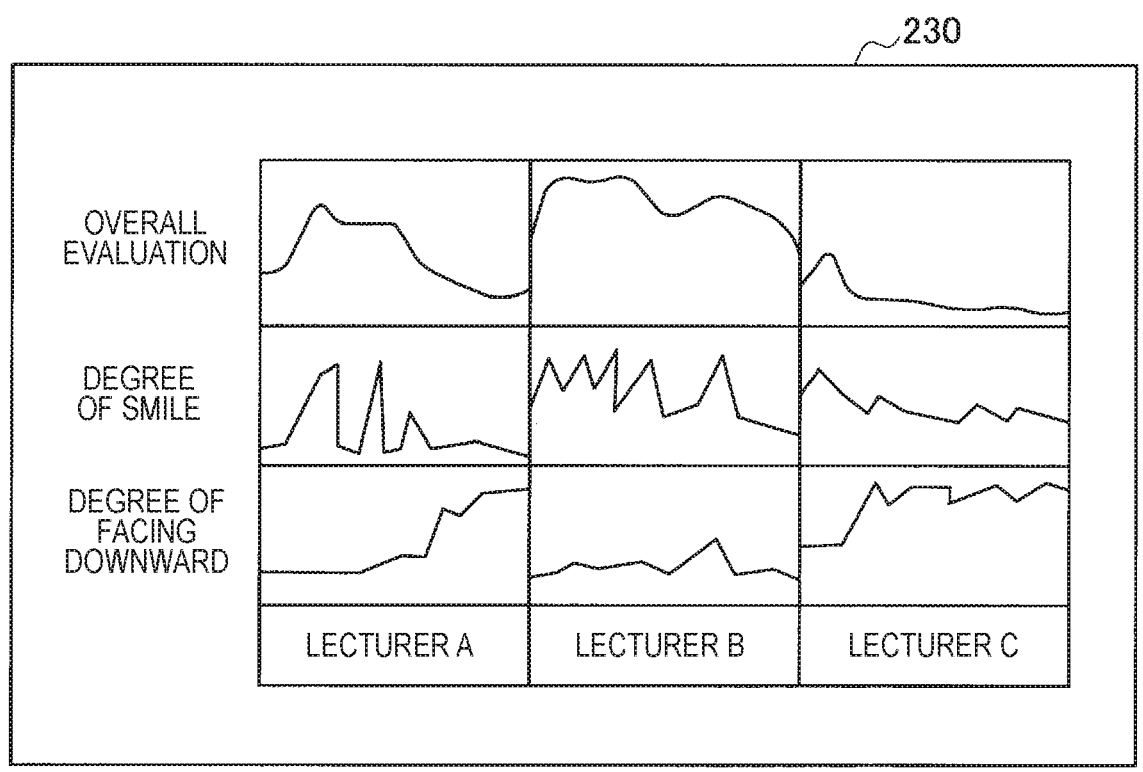
FIG. 9 is an illustration showing a display example in the evaluation comparison among a plurality of targets according to the present embodiment.

FIG. 9 is an illustration showing a display example in the evaluation comparison among a plurality of targets according to the present embodiment. In the illustrated example, the overall evaluation, the degree of smile, and the degree of facing downward for a lecturer A (the target S1), a lecturer B (the target S2), and a lecturer C (the target S3) are respectively displayed in parallel on a screen 230 by graphs. Since a high degree of smile and a low degree of facing downward result in a high evaluation, the example shown in FIG. 9 reveals that the lecturer B has the highest evaluation, then, the lecturer A has the second highest evaluation, and the lecturer C has the lowest evaluation.

«5. Supplement»

<5-1. Case where Evaluation Target is Content>

The information processing system according to the present embodiment has been described above specifically. The above-described embodiment has described an evaluation system in a case where the target S is a human being, such as a lecturer, whilst the present embodiment is not limited to this, but can also be applied to an evaluation (viewing rate research) of a content (object), such as video or a game played back in a display device, for example. The following description will be made with reference to FIG. 10 and FIG. 11.

Figure 10:
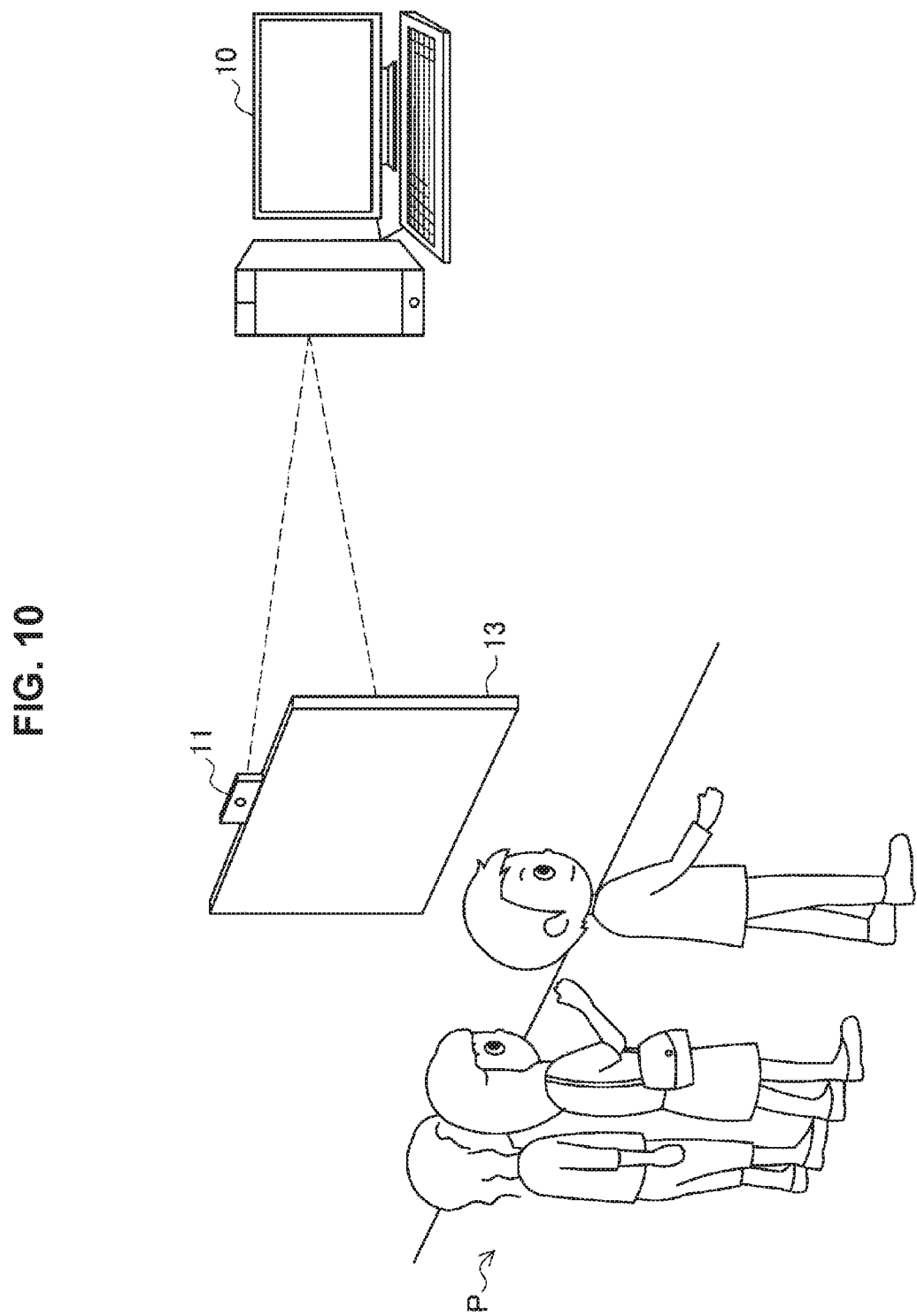
FIG. 10 is an illustration describing an overview of an information processing system in a case where an evaluation target according to the present embodiment is a content.

FIG. 10 is an illustration describing an overview of an information processing system in a case where an evaluation target is a content. In the information processing system according to the present embodiment, a digital signage 13 is installed in a station, a building, or the like, for example, as shown in FIG. 10, and it is possible to perform an evaluation of the audience P on a content being played back on the digital signage 13.

Specifically, calculation of the degree of smile, the degree of facing downward, and the overall evaluation is performed by the information processing device 10 on the basis of an imaged image of the audience P imaged with the camera 11. Since the configuration of the information processing device 10 is similar to that of the above embodiment described with reference to FIG. 2 and FIG. 3, description herein will be omitted. Evaluation processing of such a content may be performed in real time, or may be performed on the basis of imaged images in the past. In the example shown in FIG. 10, the information processing device 10 may calculate evaluation values in real time and cause the evaluation values to be displayed on the display unit on the basis of imaged images of the audience P imaged with the camera 11, while playing back a content on the digital signage 13.

Figure 11:
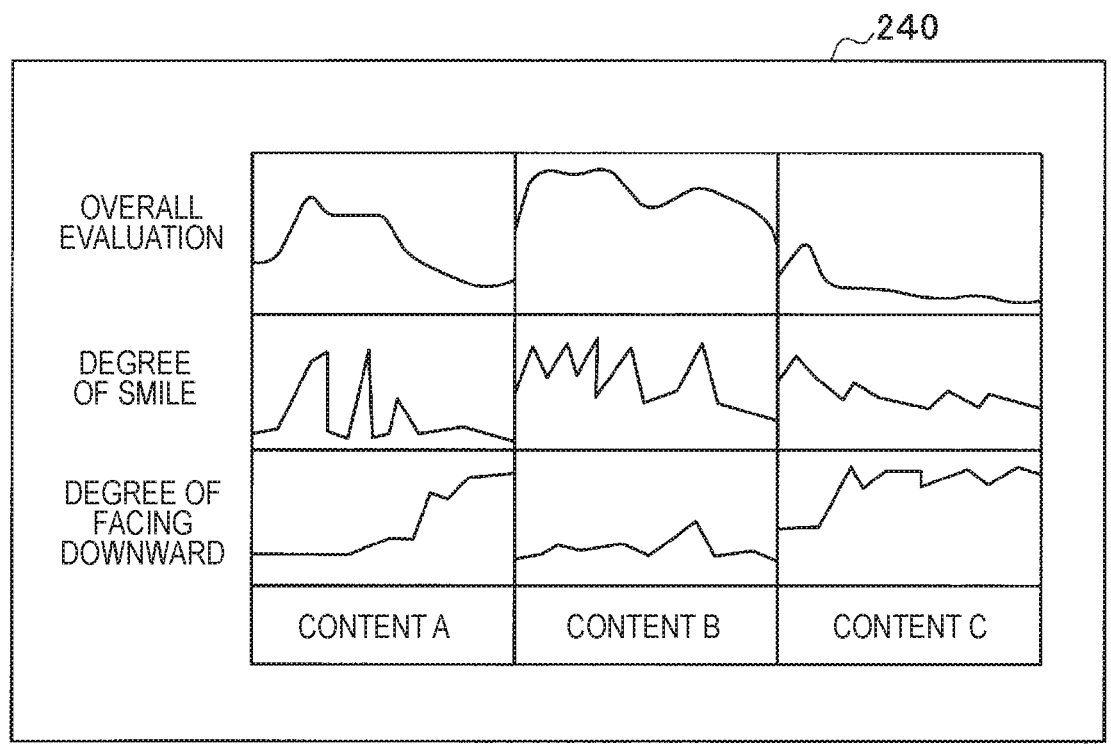
FIG. 11 is an illustration showing a display example of evaluations in a case where evaluation targets according to the present embodiment are contents.

A display example of evaluation values in a case where such a content is targeted will be described with reference to FIG. 11. FIG. 11 is an illustration showing a display example of evaluations in a case where evaluation targets are contents. In the illustrated example, the respective evaluations (the overall evaluation, the degree of smile, and the degree of facing downward) on a content A, a content B, and a content C are displayed in line on a screen 240. The respective evaluations may be calculated using imaged images of an audience having viewed the content A, the content B, and the content C (imaged images in the past), for example. Since a high degree of smile and a low degree of facing downward result in a high evaluation, the example shown in FIG. 11 reveals that the content B has the highest evaluation, then, the content A has the second highest evaluation, and the content C has the lowest evaluation.

A case where a content is played back on the digital signage 13 has been described herein as an example, whilst the present embodiment is not limited to this, but it is also possible to make evaluations (viewing rate research) similarly in a case where a content (such as a TV program) on a television is played back, for example.

<5-2. Case of Using Wearable Camera>

The fixed camera 11 is used as an imaging device that images the audience P in the above-described embodiment, whilst the present embodiment is not limited to this. For example, a wearable type camera worn by each person of the audience P may be used. Hereinafter, description will be made with reference to FIG. 12 and FIG. 13.

Figure 12:
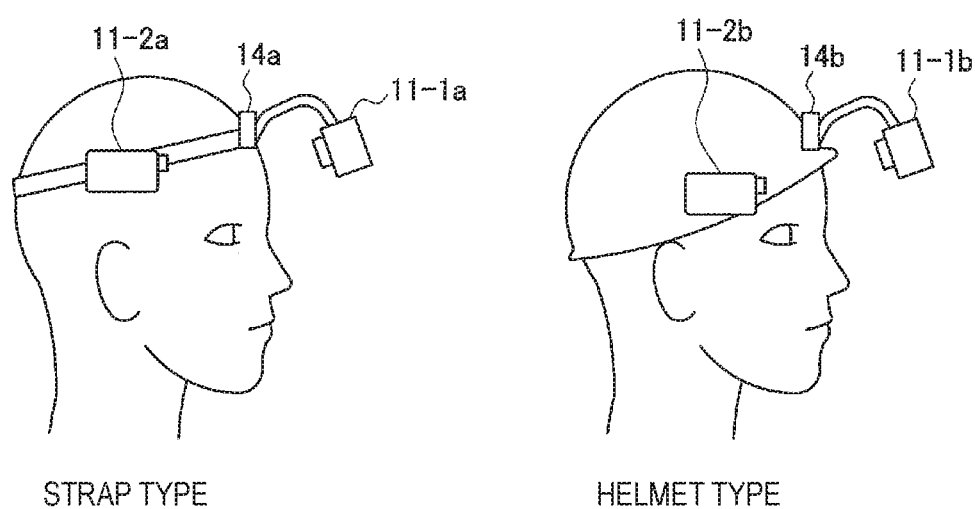
FIG. 12 is an illustration describing an example of a wearable camera according to the present embodiment.

FIG. 12 is an illustration describing an example of a wearable camera. As shown in FIG. 12, a wearable camera, for example, may be implemented by a strap type (see an illustration shown on the left side in FIG. 12) or a helmet type (an illustration shown on the right side in FIG. 12).

The strap type camera has a camera 11-1a that images an expression of a user (observer), a sensor 14a that senses a face angle of the user, and a camera 11-2a that images a target in order to assist in calculation of the face angle of the user. The camera 11-1a is installed toward the face of the user, and the sensor 14 is provided at a mounting part of the camera 11-1a, for example. In addition, the camera 11-2a is installed toward a line-of-sight direction of the user. In addition, the helmet type camera also similarly has a camera 11-1b that images an expression of a user (observer), a sensor 14*b* that senses the face angle of the user, and a camera 11-2*b* that images a target in order to assist in calculation of the face angle of the user.

The information processing device 10 (not shown) calculates an evaluation on a target on the basis of data acquired by the cameras 11-1, 11-2 and the sensor 14, each of which is worn by the audience P.

Here, the degree of smile of the user may be detected by the degree-of-smile detection unit 1012 on the basis of an image imaged with the camera 11-1.

Moreover, the degree of facing downward of the user may be detected by the face orientation detection unit 1013 on the basis of sensor data sensed by the sensor 14. The sensor 14 is, for example, a magnetic field sensor, a gyro sensor, or a tilt sensor, and can sense an orientation (Yaw) and a tilt (Pictch) of the face (head). In addition, the degree of facing downward of the user may be detected further using an image imaged with the camera 11-2 supportively. FIG. 13 is an illustration describing a case of detecting the degree of facing downward of the face of a user using an image imaged with the camera 11-2. An image 40 illustrated on the left in FIG. 13 is an imaged image example in a case where the face of a user (observer) is facing the front (in a direction diametrically opposite to a target), and an image 41 illustrated on the right in FIG. 13 is an imaged image example in a case where the face orientation of the user has become downward.

As shown in the image 40, if the face orientation of the user (observer) is diametrically opposite to an evaluation target, the center of the face of the evaluation target can be captured at the central position of the screen (x=50, y=50). On the other hand, in a case where the face orientation of the user (observer) has been displaced from the front, the center of the face of the evaluation target is displaced from the central position of the screen as shown in the image 41. Therefore, the face orientation detection unit 1013 is capable of normalizing a displacement d between the center of an imaged image imaged with the camera 11-2 (for example, x=50, y=50) and the center of the face of the evaluation target to 0 to 100, for example, to detect the degree of facing downward of the user's face. The displacement d from the center of the face of the evaluation target is calculated by the following Expression 4, for example. In this case, the displacement d may be output at a value of 0 to 7071.

[Math. 4]

$$d=\sqrt{(x-50)^2+(y-50)^2}$$ Expression 4

«6. Conclusion»

As described above, in the information processing system according to an embodiment of the present disclosure, it is possible to calculate an evaluation on a target more correctly in accordance with a substantially downward face of an observer.

In the present embodiment, from actual survey results, in a case of having no interest in a target, the face often faces downward, such as by dozing, operating a smartphone, or the like, however, an action of facing upward or sideways cannot be regarded as being highly correlated with having no interest in a target since people may think hard because they have interest in the targets, for example. In addition, the time of facing upward or sideways does not last very long (for example, about 1 minute or 3 minutes), however, the time of facing downward may last for 5 minutes or 10 minutes continually. From these results, a face facing downward can be regarded as being highly correlated with having no interest in a target, and by evaluating that an audience has no interest by "the degree of facing downward of the face" in the present embodiment, it is possible to perform an evaluation on a target more correctly and with high accuracy.

Moreover, in a case of a large audience of 30 persons or 50 persons, it is difficult to detect a line of sight of each person from an imaged image (in terms of the resolution of a camera image), resulting in increased cost and processing burden, whilst in the present embodiment, the face orientation can be grasped far more easily as compared with line-of-sight detection, and thus, it is more useful than performing an evaluation on a target on the basis of a line-of-sight direction, a gazing time, or the like also from perspectives of cost and processing burden.

Furthermore, since the overall evaluation value is obtained also using the degree of smile (positive factor) in the present embodiment in addition to the degree of facing downward of the face (negative factor), it is easier to grasp an overview of evaluations.

The preferred embodiment(s) of the present disclosure has/have been described above with reference to the accompanying drawings, whilst the present technology is not limited to the above examples. It is clear that a person skilled in the art may find various alterations or modifications within the scope of the technical ideas recited in the appended claims, and it should be understood that they will naturally come under the technical scope of the present disclosure.

For example, it is possible to create a computer program causing hardware such as a CPU, a ROM, and a RAM installed in the above-described information processing device 10 to implement the functions of the information processing device 10. Further, a computer readable storage medium having the computer program stored therein is also provided.

In addition, the degree of facing downward of the face may be detected on the basis of an area of skin colors of the whole audience or a proportion in which the parietal region is seen (in a case of facing downward, the parietal region is seen when imaging an audience from the front).

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing system including:

a degree-of-smile detection unit configured to detect a degree of smile of an observer observing a target;

a face orientation detection unit configured to detect a degree of facing downward that indicates a degree to which a face of the observer is facing substantially downward; and an evaluation calculation unit configured to calculate an evaluation on the target in accordance with the degree of smile and the degree of facing downward.

(2)

The information processing system according to (1), in which the evaluation calculation unit computes an overall evaluation value in accordance with the degree of smile and the degree of facing downward.

(3)

The information processing system according to (2), in which the face orientation detection unit is capable of computing in real time the degree of facing downward of each of face images of a plurality of observers included in a moving image imaged with an imaging unit.

(4)

The information processing system according to (3), in which the degree of facing downward is a proportion of a number of people determined as facing downward among the plurality of observers.

(5)

The information processing system according to (3) or (4), further including:

a fixed imaging device including the imaging unit configured to image the plurality of observers.

(6)

The information processing system according to (1) or (2), in which the face orientation detection unit detects the degree of smile and the degree of facing downward on the basis of sensing data detected by a sensor attached to the observer.

(7)

The information processing system according to any one of (1) to (6), further including:

a display control unit configured to display an evaluation calculated by the evaluation calculation unit.

(8)

The information processing system according to (7), in which the display control unit displays evaluations on a plurality of targets in line.

(9)

The information processing system according to any one of (1) to (6), including:

a control unit, in which the degree-of-smile detection unit, the face orientation detection unit, and the evaluation calculation unit are implemented as functions of the control unit.

(10)

An information processing method, including, by a processor:

detecting a degree of smile of an observer observing a target;

detecting a degree of facing downward that indicates a degree to which a face of the observer is facing substantially downward; and calculating an evaluation on the target in accordance with the degree of smile and the degree of facing downward.

(11)

A recording medium having a program recorded therein, the program causing a computer to function as:

a degree-of-smile detection unit configured to detect a degree of smile of an observer observing a target;

a face orientation detection unit configured to detect a degree of facing downward that indicates a degree to which a face of the observer is facing substantially downward; and an evaluation calculation unit configured to calculate an evaluation on the target in accordance with the degree of smile and the degree of facing downward.

REFERENCE SIGNS LIST 10 information processing device
101 control unit
1011 face detection unit
1012 degree-of-smile detection unit
1013 face orientation detection unit
1014 overall evaluation unit
102 image input processing unit
103 input device
104 input processing unit
105 calendar/timer unit
106 storage unit
107 external storage unit
108 display processing unit
109 display device
11 camera
13 digital signage
14 sensor

The invention claimed is:

1. An information processing system, comprising:
a processor configured to:
detect a degree of smile of a plurality of observers, wherein
the plurality of observers observes a target,
the target is different from the plurality of observers, and
the degree of smile indicates one of a first number of observers or a first proportion of observers among the plurality of observers detected to be smiling;
compute, in real time, a degree of facing downward of the plurality of observers based on each face images of the plurality of observers, wherein the degree of facing downward indicates one of a second number of observers or a second proportion of observers among the plurality of observers facing substantially downward at a downward angle exceeding a determined threshold value, and the images are included in a moving image imaged with a camera; and
calculate an evaluation value of the target in accordance with the degree of smile and the degree of facing downward.

2. The information processing system according to claim 1, wherein the processor is further configured to compute an overall evaluation value in accordance with the degree of smile and the degree of facing downward.

3. The information processing system according to claim 1, wherein the second proportion of observers corresponds to the second number of observers determined as facing downward among the plurality of observers.

4. The information processing system according to claim 1, further comprising a fixed imaging device including the camera configured to image the plurality of observers.

5. The information processing system according to claim 1, wherein the processor is further configured to detect the degree of smile and the degree of facing downward based on sensing data detected by a sensor attached to each observer of the plurality of observers.

6. The information processing system according to claim 1, wherein the processor is further configured to control a display device to display the evaluation value.

7. The information processing system according to claim 6, wherein the processor is further configured to control the display device to display evaluations on a plurality of targets.

8. The information processing system according to claim 1, wherein the processor is further configured to detect the degree of facing downward based on orientations of faces of the plurality of observers.

9. An information processing method, comprising:
  detecting a degree of smile of a plurality of observers, wherein
    the plurality of observers observes a target,
    the target is different from the plurality of observers, and
    the degree of smile indicates one of a first number of observers or a first proportion of observers among the plurality of observers detected to be smiling;
  computing, in real time, a degree of facing downward of the plurality of observers based on each face images of the plurality of observers, wherein the degree of facing downward indicates one of a second number of observers or a second proportion of observers among the plurality of observers facing substantially downward at a downward angle exceeding a determined threshold value, and the images are included in a moving image imaged with a camera; and
  calculating an evaluation value of the target in accordance with the degree of smile and the degree of facing downward.

10. A non-transitory computer-readable medium having stored thereon, computer-executable instructions which, when executed by a computer, cause the computer to execute operations, the operations comprising:
  detecting a degree of smile of a plurality of observers, wherein
    the plurality of observers observes a target,
    the target is excluded from the plurality of observers, and
    the degree of smile indicates one of a first number of observers or a first proportion of observers among the plurality of observers detected to be smiling;
  computing, in real time, a degree of facing downward of the plurality of observers based on each face images of the plurality of observers, wherein the degree of facing downward indicates one of a second number of observers or a second proportion of observers among the plurality of observers facing substantially downward at a downward angle exceeding a determined threshold value, and the images are included in a moving image imaged with a camera; and
  calculating an evaluation value of the target in accordance with the degree of smile and the degree of facing downward.

* * * * *